(12) United States Patent
Hjelland

(10) Patent No.: US 7,838,641 B2
(45) Date of Patent: Nov. 23, 2010

(54) PROCESS FOR THE PRODUCTION OF ALGINATE HAVING A HIGH MANNURONIC ACID-CONTENT

(75) Inventor: Finn Hjelland, Vormedal (NO)

(73) Assignee: FMC Biopolymer AS, Drammen (NO)

( * ) Notice: Subject to any disclaimer, the term of this patent is extended or adjusted under 35 U.S.C. 154(b) by 246 days.

(21) Appl. No.: 10/497,213

(22) PCT Filed: Nov. 21, 2002

(86) PCT No.: PCT/NO02/00431

§ 371 (c)(1),
(2), (4) Date: Jun. 1, 2004

(87) PCT Pub. No.: WO03/046199

PCT Pub. Date: Jun. 5, 2003

(65) Prior Publication Data

US 2005/0038237 A1 Feb. 17, 2005

(30) Foreign Application Priority Data

Nov. 30, 2001 (NO) .................................. 20015874

(51) Int. Cl.
*C08B 37/04* (2006.01)
(52) U.S. Cl. ...................... 536/3; 536/123.1; 536/124; 536/128; 514/54
(58) Field of Classification Search .............. 536/3, 536/123.1, 124, 128; 514/54
See application file for complete search history.

(56) References Cited

U.S. PATENT DOCUMENTS

| 2,128,551 | A | | 8/1938 | Le Gloahee | |
|---|---|---|---|---|---|
| 3,396,158 | A | * | 8/1968 | Haug | ............................. 536/3 |
| 5,596,084 | A | | 1/1997 | Sanderson et al. | |
| 6,121,441 | A | | 9/2000 | Simensen et al. | |

FOREIGN PATENT DOCUMENTS

| DE | 19836960 | 2/2000 |
|---|---|---|
| GB | 862702 | 3/1961 |
| WO | 9851710 | 11/1998 |
| WO | 0156404 | 8/2001 |

OTHER PUBLICATIONS

Nishide et al. (Nippon Saisan Gakkaishi, (1987) 53 (7) 1215-1219).*
Database WPI, Week 200272, Derwent Publications Ltd., London, Great Britain; Class D13, AN 2002-668951, & JP 2002119226 A (Shiga A), Apr. 23, 2002.
*FMC Alginates, General Technology*, FMC Biopolymer, 2000.
A. Haug, et al., Correlation between Chemical Structure and Physical Properties of Alginates, *Acta Chem. Scand.*, 21(3), 768-778 (1967).
*KELCO/ALGIN/hydrophilic derivatives of alginic acid for scientific water control*, $2^{nd}$ ed., 1976, pp. 7 and 8.

* cited by examiner

*Primary Examiner*—Shaojia Anna Jiang
*Assistant Examiner*—Michael C Henry
(74) *Attorney, Agent, or Firm*—FMC Corporation

(57) ABSTRACT

The present invention concerns a process for the production of alginate having a mannuronic acid-content of at least 80 mole %, wherein said alginate is produced by: a) adding algae or seaweed to water under stirring, in a ratio of 1:3 to 1:20 respectively, at a pH above about 2.3, while maintaining a temperature above 20° C. for at least 30 minutes, and b) separating said alginate from the solid material of the suspension in a) by a standard separation method such as filtration, and optionally c) recovering said alginate from the solution.

21 Claims, 1 Drawing Sheet

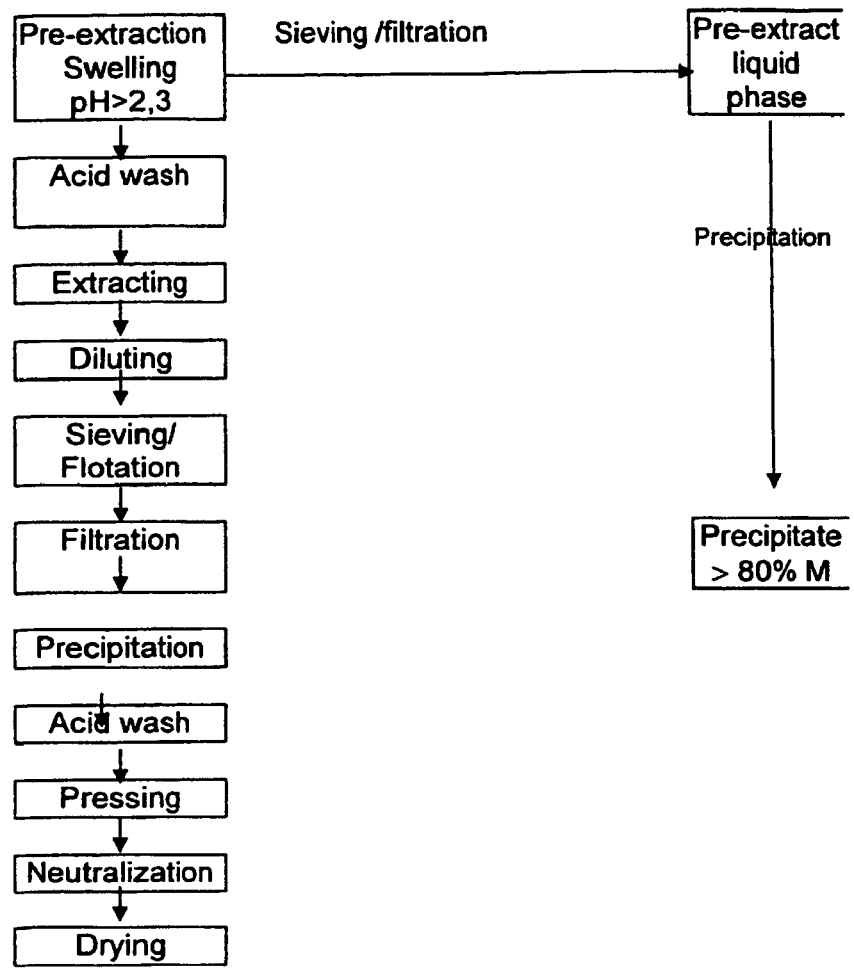
Figure 1 shows the general process for the production and recovery of a separate fraction containing alginate with a high mannuronic acid-content

PROCESS FOR THE PRODUCTION OF ALGINATE HAVING A HIGH MANNURONIC ACID-CONTENT

The present invention concerns a modified procedure for the production of alginate having a high mannuronic acid-content, in which the initial pre-extraction step of the algae is modified by adjustment of pH in order to separately recover an alginate fraction of a very high mannuronic acid-content. Typically, with this modified procedure, the alginate fraction, when recovered from the initial pre-extraction step contains at least 80 mole % mannuronic acid in the alginate.

BACKGROUND OF THE INVENTION

Alginates are isolated from marine brown algae. Alginate is also produced in soil bacteria such as *Azotobacter vinelandii* and *Azotobacter crococcum* and several different *Pseudomonas* sp. Brown algae are however generally the source of commercially available alginates.

Alginates are used in foodstuffs and in pharmaceutical, dental, cosmetic and other industrial products. The most common industrial applications are based on their hydro colloidal and poly electrolytical nature, which forms the basis for the gel-forming, thickening, stabilizing, swelling and viscosity-providing properties.

Alginates are salts of alginic acid, a linear, hetero polysaccharide consisting of (1-4) linked β-D-mannuronic acid, designated as M, and α-L-guluronic acid, designated as G. These two uronic acids have the following formulae:

distribution of the blocks depends on the type of algae from which the alginate is isolated, as well as on the age and part of the plant. For example alginate from the stalk may have a different sequence and block composition compared with alginate isolated from the leaves. The time of year at which the algae are harvested also affects the block composition and sequence. According to common knowledge, the highest G-content can be found in the stem of old *L. hyperborea*. The leaf of the same species has a somewhat lower G-content and shorter G-blocks, but the content is still higher than most other species. Commercially available alginates usually have a G-content of 25%-70%.

Sources which have a high content of M-blocks are for example species of the brown algae genera *Durvillea, Laminaria, Lessonia, Fucales* and *Ascophyllum*, in particular the fruiting bodies of *Ascophyllum* during spring are rich in mannuronic acid.

Alginates which are rich in mannuronic acid have been shown to possess immunostimulating activity as described in U.S. Pat. No. 5,169,840.

DESCRIPTION OF PRIOR ART

Norwegian Patent No. 305,033, corresponding to U.S. Pat. No. 6,121,441 describes a procedure for producing uronic acid blocks from alginate. This patent is however concerned with a fractionated release of the different block-fractions; G, M and MG in an industrial suitable manner wherein the liquid

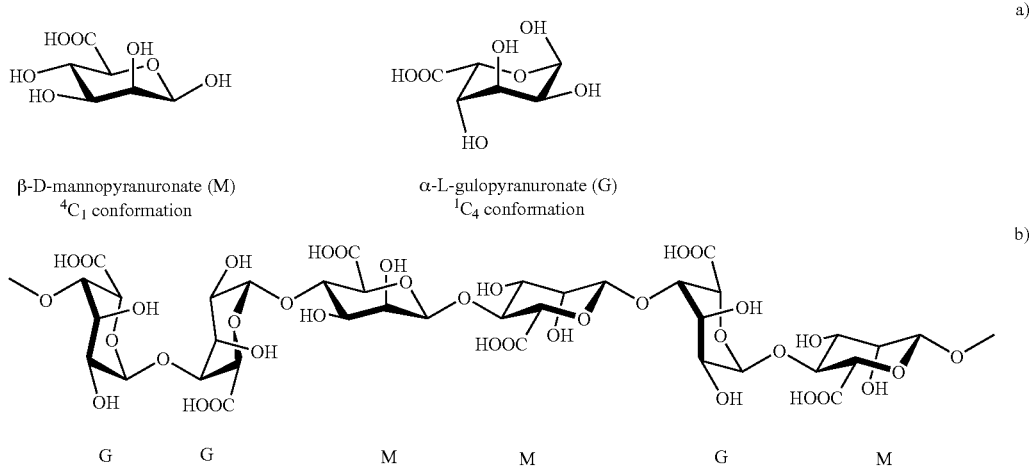

a)

β-D-mannopyranuronate (M)
$^4C_1$ conformation

α-L-gulopyranuronate (G)
$^1C_4$ conformation b)

G G M M G M

The polymers exist as homopolymer sequences of mannuronic acid, called M-blocks, homopolymer sequences of guluronic acid called G-blocks, and mixed sequences of mannuronic and guluronic acid units, designated MG-blocks or alternating blocks.

The following scheme represents an illustration of the structure of alginates:

MMMMMMGGGGGGGMGMGMGMGGGGGGGM

M-block G-block MG-block G-block

Alginates usually contain all three types of blocks and a block typically consists of three to thirty monomer units. The volumes are kept down. Also the conditions described in the fractionated precipitation procedure are optimised in order to obtain pure fractions.

Other preparative processes for the production of Poly M-alginates, wherein the content of mannuronic acid is 80% ($F_M$=0.80) are known from Rosell, K. G. and Srivastava, L. M., Can. J. Bot, 62 (1984), p. 2229-2236, Craigie, J. S. et al, Carbohydr. Polym., 4 (1984), p. 237-252 and Wedlock, D. J. et al., Food Hydrocolloids, 4 (1990), p. 41-47.

A simple modification of the pre-extraction step of an industrial process as in the present invention is however not described. The present invention which separately recovers, or retains a fraction of alginate of a high mannuronic acid-content therefore represents a simple and economic way of production compared with the processes of the prior art.

In PCT/US91/00475, a mannuronic acid-containing alginate wound healing composition and method of its use are described. The composition comprises biopolymers such as alginates of at least 70 mole % β-D-mannuronic acid (M). According to this publication on page 2, line 17, a few algae sources are capable of producing alginate having a G-content of less than 30%. However bacteria are stated as the preferred source of high M-containing alginate. The present invention differs essentially from this teaching in that it describes a modified industrial process for production of alginate, and further that this modified process keep an alginate fraction with a high mannuronic acid-content which is otherwise lost in the industrial standard extraction process.

GENERAL DESCRIPTION OF THE INVENTION

The standard industrial process of production of water-extractable alginate has now been improved by the modification of the pre-extraction step or the so-called swelling step. This step is modified to be conducted at a certain pH. The pH is kept above about 2.3 in the pre-extraction step which surprisingly results in a 3D soluble alginate fraction with a very high mannuronic acid-content, preferably at least 80 mole % of M. This soluble alginate-fraction can be recovered in a separate fraction before the initiation of the extraction step in the standard procedure as set out below:

Step 1: Pre-extraction or swelling of alga material
Step 2: Extraction of alga material
Step 3: Sieving
Step 4: Filtration
Step 5: Precipitation with for example acid or alcohol or treatment with earth alkaline metal or alkaline metal salts
Step 6: Acid washing (if acid not is used in step 5)
Step 7: Drying of alginic acid, and optionally a
Step 8: Neutralisation of the alginic acid with a suitable base, and
Step 9: Drying of the resulting alginate Possible intermediate washing steps with diluted acid solutions can be carried out between the different steps 1-9 above. In step 8 the base can be for example sodium or calcium carbonate, resulting in the corresponding sodium or calcium alginate in step 9.

In this invention the pH in the pre-extraction step (swelling step) is kept at a pH above "about 2.3" which means, as used herein, 2.3+/−0.1.

In the aspect of this invention, the mannuronic acid-rich fraction is recovered separately, the pH of the pre-extraction step is kept to a pH above about 2.3, and the liquid fraction is isolated from the suspension of the pre-extraction or swelling step by filtration, or any other standard separation method like centrifugation, or sieving. Subsequently the alginate can optionally be precipitated from the liquid fraction in any conventional manner with alcohol, acid or salt, such as ethanol, hydrochloric acid, sulphuric acid or calcium chloride.

The process according to the invention, wherein the pH is kept at a: pH above about 2.3 in the pre-extraction step, led to a yield in the range 0.05-10% by weight, preferably within 2%-6% by weight of the mannuronic acid-rich fraction as stated in table 2, on page 8. The alginate recovered has a M-content of at least 80 mole %. The present invention thus offers an economic and simple method of production of a high-content mannuronic acid alginate, which is an alginate product particularly suitable for medically, veterinary and dietary applications.

BRIEF DESCRIPTION OF THE FIGURES

FIG. 1 shows the general process for the production and separate recovery of a fraction of alginate having a very high mannuronic acid-content of above 80 mole % mannuronic acid.

DETAILED DESCRIPTION OF THE INVENTION

An aspect of this invention concerns a process for production of alginate having a mannuronic acid-content of at least 80 mole %, wherein the said alginate is produced by:

a) adding algae or seaweed to water under stirring, in a ratio of 1:3 to 1:20 respectively, at a pH above about 2.3, while maintaining a temperature above 20° C. for at least 30 minutes, and b) separating said alginate from the solid material of the suspension in a) by a standard separation method such as filtration, and optionally c) recovering said alginate.

The alginate fraction is isolated from the solid material by filtration, or any other suitable standard separation method such as centrifugation or sieving, and the alginate with a mannuronic acid-content is optionally recovered from the solution by precipitation with acid, salt or alcohol.

The starting material of the present invention is algae or seaweed, in particular brown algae, which is treated with formaldehyde, in order to fixate the phenols and preserve the algae. Further the algae can be washed with acid to remove the highly viscous fucoglycans. It is understood that the algae can be pre-treated in any known manner. Commercially available alginates, most preferably dried and milled algae of the species Durvillea can be used, but also fresh, whole or unmilled algae from *Durvillea, Laminaria, Lessonia, Ascophyllum* or *Fucales* are suitable as starting materials in the present process.

The invention is illustrated by the following non-limiting examples.

Example 1

Modified Process Wherein the pH is Above 2.3 in the "Pre-Extraction" Step

Description of the Process:

Starting raw material from different *Durvillea* species, *D. potatorum* (milled) as sample 1 and *D. antarctica* (not milled) as sample 2 were added to water in the amounts set forth in the table below, and stirred by hand from time to time, at a temperature of 55° C. for 3.5 hours. After storage at ambient temperature over the night, the algae were extracted a second time at 55° C. for 1 hour, then 2.5 ml formaldehyde was added and the extraction continued for 1 hour.

"Pre-extraction" Step

| Sample | Weight [gram] | Water [ml] | Time [hours] | Temperature [° C.] | Formaldehyde [ml] | PH |
|---|---|---|---|---|---|---|
| 1 | 50.0 | 500 | 5.5 | 55 | 2.5 | 5.9 |
| 2 | 40.0 | 500 | 5.5 | 55 | 2.5 | 6.9 |

Filtration

The suspension was then sieved on a 60-mesh filter and washed two times with an excess of water. The solution was then filtrated with filter aid on a vacuum funnel and thereafter on a membrane filter.

Acid Precipitation

The solution was then allowed to cool to 10° C. and was then added NaCl to a 0.5%-concentration. Thereafter drops of dilute 5.5M hydrochloric acid was carefully added by stirring with magnet to a pH 1.8. A white precipitate was formed. The suspension was, after being kept at 10° C. for 30 minutes, sieved on a 120 mesh-filter cloth and pressed carefully by hand resulting in pasty, yellow mass that turned to fine fiber after pressing.

Neutralization

All the acid material was transferred to a 250 ml vessel and added water to bring the volume to 200 ml, before neutralized to pH 7, with solid soda ash under magnetic stirring.

Filtration

The solution was once again filtrated on a 0.8 micron filter membrane of cellulose nitrate.

Alcohol Precipitating

The filtrate was cooled to 10° C. and precipitated with isopropyl alcohol in the ratio 1:1. The fibers formed were washed once with 70 volume % isopropyl alcohol and then a second time with 100 volume % isopropyl alcohol Drying The fibers were drawn out with a pincer and then freeze-dried.

Results are given in table 1.

TABLE 1

| Sample | Alga | Weight [gram] | Product Yield [gram] | % Alginate (hot water extracted) |
|---|---|---|---|---|
| 1 | D. potatorum | 50 | 1.08 | 2.1 |
| 2 | D. antarctica | 40 | 1.59 | 4.0 |

Analysis of Product

| Sample | Alga | Intrinsic viscosity dL/g | Molecule weight Dalton/g | % Mannuronic acid NIR model ALGLN2D |
|---|---|---|---|---|
| 1 | D. potatorum | 2.7 | 44 009 | 82 |
| 2 | D. antarctica | 7.0 | 118 892 | 88 |

Block-Distribution of Product Measured on NMR 400 Hz

| Sample | Alga | M | G | MM | GG | GM/MG |
|---|---|---|---|---|---|---|
| 1 | D. potatorum | 85.9 | 14.1 | 76.3 | 4.5 | 9.6 |
| 2 | D. antarctica | 90.9 | 9.1 | 84.8 | 3.0 | 6.1 |

Table 2 shows yields of mannuronic acid from other seaweed-samples produced as in example 1.

TABLE 2

| Alga/Seaweed | Form | Dry Matter % | Yield w/w % | Mannuronic acid % |
|---|---|---|---|---|
| Ascophyllum nodosum, spring | Whole, cut | 20 | 0.035 | 90 |
| Durvillea antarctica, Chile, 1996 | Unmilled | 85 | 4 | 91 |
| Durvillea antarctica, Chile, 1996 | Milled | 85 | 6 | 89 |
| Durvillea antarctica, Chile, 1998 | Whole | 85 | 1.3 | 87 |
| Durvillea antarctica, Chile, 2000. | Milled | 85 | 2.5 | 91 |
| Durvillea potatorum, Tasmania, 1997 | Milled | 85 | 2.1 | 86 |
| Lessonia trabeculata, Chile, 1996 | Milled | 85 | 0.125 | NA |
| Lessonia nigrescens, Chile, 1995 | Milled | 85 | — | NA |
| Laminaria hyperborea, leaves | Fresh, cut | 18 | — | NA |
| Saragassum, Tanzania, August, 1991. | Milled | 85 | — | NA |
| Macrocystes pyrifera, Chile, 1994 | Milled | 85 | — | NA |
| Laminaria japonica, Japan, 1988 | Whole, cut | 85 | 0.2 | NA |
| Fucus spiralis, summer, 1994 | Whole, cut | 15 | 0.026 | 91 | wherein NA = not analysed

Example 2

Modified Process Wherein the pH is Above 2.3 and Salt is Added in the "Pre-Extraction" Step It is possible to further increase the content of mannuronic acid by addition of salt in the "pre-extraction" step.

Description of the process:

"Pre-Extraction" Step 20 gram Durvillea antarctica (milled coarse particles >70 mesh) algae from Chile August 1996 was added 500 ml water and a certain amount of NaCl, and was extracted under stirring on a Jar test machine, at stirring speed 140 rpm for 2 hours, at a temperature of 20° C. The salt was added to a concentration in the solution (% by weight), as set forth in table 3.

TABLE 3

| Sample | Durvillea Antarctica [gram] | Water [ml] | NaCl conc. | Extraction time, [hours] | Remarks |
|---|---|---|---|---|---|
| A | 20 | 500 | 0 | 2 | |
| B | 20 | 500 | 0.2% | 2 | |
| C | 20 | 500 | 0.5% | 2 | |
| D | 20 | 500 | 1.0% | 2 | |
| E | 20 | 500 | 2.0% | 2 | |
| F | 20 | 500 | 3.0% | 2 | |
| G | 20 | 500 | 3.4% | 2 | |
| H | 20 | 500 | — | 2 | Seawater |

Sieving

The material was then sieved on a 400 mesh filtration cloth and pressed by hand. The sieved solution was weighed and pH measured as given in table 4.

TABLE 4

| Sample | NaCl conc. | Amount sieved [gram] | pH | Remarks |
|---|---|---|---|---|
| A | 0 | 377 | 6.3 | |
| B | 0.2% | 371 | 6.0 | |
| C | 0.5% | 389 | 6.0 | |
| D | 1.0% | 397 | 5.9 | |
| E | 2.0% | 417 | 5.8 | |
| F | 3.0% | 444 | 5.8 | |
| G | 3.4% | 455 | 5.0 | |
| H | — | 421 | 6.4 | Seawater |

Filtration

The sieved solution was then filtrated by vacuum (water suction pump) on a funnel with filter paper. The viscosity of the filtrated solution was measured on a glass tube and the results are given in table 5.

TABLE 5

| Sample | NaCl conc. | Amount of filtrate [gram] | time measured, [seconds] | Viscosity calculated [cps] |
|---|---|---|---|---|
| A | 0 | 277 | 18.7 | 11.6 |
| B | 0.2% | 286 | 16.0 | 9.9 |
| C | 0.5% | 319 | 13.8 | 8.6 |
| D | 1.0% | 330 | 12.2 | 7.6 |
| E | 2.0% | 408 | 7.5 | 4.7 |
| F | 3.0% | 438 | 4.9 | 3.0 |
| G | 3.4% | 445 | — | 2.6 |
| H | — | 402 | — | 2.9 |

Acid Precipitating

The filtrate was cooled to below 15° C. and each of the samples were added drops of 5.5 M hydrochloric acid until the pH reached 1.8-2.0, under stirring with a magnetic stirrer. A fiber shaped precipitate was formed. The precipitate was then sieved on a 400-mesh filtration cloth and pressed by hand.

Neutralization

The alginic acid was then diluted with water and neutralized with solid soda; ash to pH 6-7 under stirring until completely dissolved.

Alcohol Precipitating

The solution was then cooled and precipitated with equal parts of isopropyl alcohol. Thereafter washed with 70 volume % isopropyl alcohol, and repeatedly washed with pure 100 volume % isopropyl alcohol.

Drying

The precipitated fiber was pulled out by a pincer and transferred to a vessel and freeze dried overnight in vacuum.

Results

The results are shown in table 6, wherein the amount of yield was calculated assuming that no alginate was lost and that all the alginate is dissolved in the water added.

TABLE 6

| Sample | NaCl conc. | Amount alginate precipitated [gram] | Amount alginate [g/l] | % yield real | M-block. NIR Model ALGLN2D |
|---|---|---|---|---|---|
| A | 0 | 1.26 | 3.34 | 6.3 | 88% |
| B | 0.2% | 1.03 | 3.60 | 5.1 | |
| C | 0.5% | 1.11 | 3.48 | 5.6 | |
| D | 1.0% | 1.14 | 3.45 | 5.7 | |
| E | 2.0% | 1.20 | 2.87 | 6.0 | |
| F | 3.0% | 0.80 | 1.80 | 4.0 | |
| G | 3.4% | 0.54 | 1.21 | 2.7 | 91.8% |
| H | Seawater | 0.53 | 1.32 | 2.7 | 95.8% |

Example 3

Modified Process Wherein the pH is Above pH 2.3 and Salt is Added in the "Pre-Extraction" Step Description of the Process:

The content of mannuronic acid in the separate fraction was further increased by addition of $CaCl_2$. The starting material was *D. antarctica* from Chile that was milled to coarse particles of a size >70 mesh.

"Pre-Extraction"

The amounts and conditions of the "pre-extraction" step are set out in table 7. The "pre-extraction" (extraction) was carried out under stirring on Jar tester with about 140 rpm.

TABLE 7

| Sample | Weight [gram] | Water [m/l] | Time [hours] | Temperature [° C.] | pH | Calcium chloride [N] |
|---|---|---|---|---|---|---|
| A | 20.0 | 500 | 2 | 25 | 6.08 | 0.01 |
| C | 20.0 | 498 | 2 | 25 | 5.8 | 0.03 |
| D | 20.0 | 496 | 2 | 25 | 5.7 | 0.06 |
| B | 20.0 | 500 | 2 | 25 | 5.85 | 0.1 |

Filtration

The material was then sieved on a 400-mesh filter and pressed by hand. The solution was then heated to about 30° C. and filtrated with paper on a vacuum Suction flask.

TABLE 8

| Sample | Calcium chloride [N] | Sieved sol. 400 mesh [gram] | Filtrated solution [gram] |
|---|---|---|---|
| A | 0.01 | 404 | 397 |
| C | 0.03 | 423 | 398 |
| D | 0.06 | 440 | 420 |
| B | 0.1 | 462 | 457 |

Acid Precipitation

The solution was then cooled to 10° C. and added sodium chloride to 0.5%. Then drops of 5.5 M HCl were added, with carefully magnetic stirring until pH 1.8. A white precipitate was formed. The material suspension was then stored for 30 minutes and sieved on 400-mesh filtration cloth and pressed carefully by hand. The material was a pasty yellow mass, which turned to fine bright fibers after pressing.

Neutralization

The acid material was then transferred to a 250 ml vessel and added water to bring the volume to 200 ml and then neutralized to pH 7 with solid soda ash under magnetic stirring.

Alcohol Precipitating

The filtrate was then cooled to 10° C. and precipitated on stirring with 100 volume % isopropyl alcohol in a ratio 1:1. Large fibers were precipitated. The fibers were washed twice with 70 volume % isopropyl alcohol and finally with 100 volume % isopropyl alcohol.

Drying

The fibers were then pulled out by a pincer, and thereafter freeze dried overnight under vacuum.

Results

The results are given in tables 9 and 10 which show the yields and the increase in content of mannuronic acid in the alginate with more than 80% M, from maximum 91% M when salt not was added (confer table 2), to a maximum of 95% M when salt was added to the "pre-extraction" step.

TABLE 9

| Sample | Calcium chloride [N] | Yield alginate [gram] | Yield alginate [g/l] | Yield % |
|---|---|---|---|---|
| A | 0.01 N | 1.29 g | 3.19 | 6.5 |
| C | 0.03 N | 0.52 g | 1.31 | 2.6 |
| D | 0.06 N | 0.19 g | 0.45 | 0.9 |
| B | 0.1 N | — | 0 | 0 |

TABLE 10

| Sample | Calcium chloride [N] | % Mannuronic acid NIR model LND 2 | % M NMR | % G NMR | % MM NMR | % GM/MG NMR | % GG NMR |
|---|---|---|---|---|---|---|---|
| A | 0.01 N | 98.7 | 89.0 | 11.0 | 82.0 | 8.0 | 3.0 |
| C | 0.03 N | 101.6 | 92.0 | 8.0 | 86.0 | 6.0 | 1.6 |
| D | 0.06 N | 102.5 | 95.0 | 5.0 | 90.0 | 5.0 | 0 |
| B | 0.1 N | — | — | — | — | — | — |
| E | water only | | 88.7 | 11.3 | 80.4 | 8.3 | 3.0 |

Example 4

Reference Example

Description of a standard process for the production of alginate with a very high mannuronic acid content.

Fresh *Ascophyllum nodosum* algae from Karmøy, Norway were used as starting material.

Pressing 50 kg of algae were pressed on a roller press type "Haller" with a capacity of 280 kg of algae per hour. A total of 300 ml of extract was collected.

Filtration

The extract was filtrated on coarse filter paper with use of water suction.

Acid Precipitating

Volume of 255 g was added 1,5% NaCl and then drops of 5.5 M diluted hydrochloric acid until pH reached 1.5. Yellow flocs precipitated and was sieved from the solution on a 400 mesh filtration cloth and pressed by hand.

Neutralisation

The flocks dissolved by adding 50 ml of water and solid soda ash to pH 9. The solution was then filtrated with black band filter paper.

Alcohol Precipitation

The solution was precipitated with equal amounts of isopropyl alcohol. The precipitated material was sieved on a 400-mesh filtration cloth and washed once with acetone. The material was then dried 4 hours by 105° C.

Results

The results are given in table 11 below

TABLE 11

| Alga | Amount [kg] | Extract [ml] | Alginate [mg] | Conc. [mg/l] | Yield (wet algae). [g/kg] |
|---|---|---|---|---|---|
| *A. nodosum* | 50 | 300 | 35 | 12 | 0.0007 |

The mannuronic acid content of the alginate prepared in reference example 5, was 94.4% M-block and 91.8% MM-block.

The invention claimed is:

1. A process for the production of alginate having a mannuronic acid-content of at least 80 mole %, the process comprising the steps of:
   a) swelling fresh or dried algae or seaweed selected from at least one member of the group consisting of *Durvillea, Laminaria, Lessonia, Fucales* and *Ascophyllum* in water under stirring, in a ratio of 1:3 to 1:20, respectively, at a pH between 2.3 and 7, while maintaining a temperature above 20° C. for at least 30 minutes and forming a suspension of a solid material and a liquid fraction comprising the alginate having a mannuronic acid-content of at least 80 mole % with the proviso that said water used to swell said fresh or dried algae or seaweed does not contain formaldehyde,
   b) separating said liquid fraction comprising the alginate having a mannuronic acid-content of at least 80 mole % from the solid material of the suspension formed in step a) by a
   separation method, wherein said alginate having a mannuronic acid-content of at least 80 mole % is obtained having a yield of from 2-10%, and, optionally,
   c) recovering said alginate having a mannuronic acid-content of at least 80 mole % from the liquid fraction.

2. The process according to claim 1, in which the pH in step a) is 5 to 7.

3. The process according to claim 1, in which in step a) the temperature is maintained at 55° C. and the extraction time is 5.5 hours.

4. The process according to claim 1, in which the separation method is filtration.

5. The process according to claim 1, in which the process comprises step c), and the alginate is recovered from the liquid fraction by precipitation.

6. The process according to claim 1, in which step a) further comprises the addition of 0.1-5% by weight of a salt to the liquid fraction, based on the weight of the liquid fraction.

7. The process according to claim 6, in which the salt is $CaCl_2$ or NaCl.

8. The process according to claim 6, in which the pH in step a) is 5 to 7.

9. The process according to claim 2, in which in step a) the temperature is maintained at 55° C. and the extraction time is 5.5 hours.

10. The process according to claim 2, in which the process comprises step c), and alginate is recovered from the liquid fraction by precipitation.

11. The process according to claim 3, in which the process comprises step c), and alginate is recovered from the liquid fraction by precipitation.

12. The process according to claim 4, in which the process comprises step c), and alginate is recovered from the liquid fraction by precipitation.

13. A process for the production of alginate having a mannuronic acid-content of at least 80 mole %, the process comprising the steps of:
   a) swelling fresh or dried algae or seaweed selected from at least one member of the group consisting of *Durvillea, Laminaria, Lessonia, Fucales* and *Ascophyllum* in water under stirring, in a ratio of 1:3 to 1:20, at a pH between 2.3 and 7, while maintaining a temperature above 20° C. for at least 30 minutes and forming a suspension of a solid material and a liquid fraction comprising the alginate having a mannuronic acid-content of at least 80 mole % with the proviso that said water used to swell said fresh or dried algae or seaweed does not contain formaldehyde,
   b) separating said liquid fraction comprising the alginate having a mannuronic acid-content of at least 80 mole % from the solid material of the suspension in step a) by a separation method, wherein said alginate having a mannuronic acid-content of at least 80 mole % is obtained having a yield of from 2-10%, and
   c) recovering said alginate having a mannuronic acid-content of at least 80 mole % from the liquid fraction.

14. The process according to claim 13, in which the pH in step a) is 5 to 7.

15. The process according to claim 13, in which in step a) the temperature is maintained at 55° C. and the extraction time is 5.5 hours.

16. The process according to claim 13, in which step a) further comprises the addition of 0.1-5% by weight of a salt to the liquid fraction, based on the weight of the liquid fraction.

17. The process according to claim 16, in which the salt is $CaCl_2$ or NaCl.

18. The process of claim 1 in which salt is not added to the liquid fraction in step a).

19. The process of claim 13 in which salt is not added to the liquid fraction in step a).

20. The process of claim 1 in which the seaweed is *Durvillaea antarctica* or *Durvillaea potatorum*.

21. The process of claim 13 in which the seaweed is *Durvillaea antarctica* or *Durvillaea potatorum*.

* * * * *